United States Patent
Inam et al.

(10) Patent No.: US 10,559,975 B2
(45) Date of Patent: *Feb. 11, 2020

(54) SYSTEM AND METHOD FOR DISTRIBUTED GRID CONTROL WITH SUB-CYCLIC LOCAL RESPONSE CAPABILITY

(71) Applicant: Smart Wires Inc., Union City, CA (US)

(72) Inventors: Haroon Inam, San Jose, CA (US); Debrup Das, Union City, CA (US); Frank Kreikebaum, Oakland, CA (US); Amrit Iyer, San Leandro, CA (US); Aaron Zhao, Fremont, CA (US)

(73) Assignee: Smart Wires Inc., Union City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/997,292

(22) Filed: Jun. 4, 2018

(65) Prior Publication Data
US 2018/0287421 A1    Oct. 4, 2018

Related U.S. Application Data

(63) Continuation of application No. 15/068,397, filed on Mar. 11, 2016, now Pat. No. 10,097,037.
(Continued)

(51) Int. Cl.
*G05B 15/02* (2006.01)
*H02J 13/00* (2006.01)
*H02J 3/18* (2006.01)

(52) U.S. Cl.
CPC ........ *H02J 13/0006* (2013.01); *H02J 3/1814* (2013.01); *Y02E 40/10* (2013.01);
(Continued)

(58) Field of Classification Search
CPC ...................................................... G05B 15/02
(Continued)

(56) References Cited

U.S. PATENT DOCUMENTS

| | | | |
|---|---|---|---|
| 2,237,812 | A | 4/1941 | De Blieux |
| 2,551,841 | A | 5/1951 | Kepple et al. |

(Continued)

FOREIGN PATENT DOCUMENTS

| | | |
|---|---|---|
| CH | 660094 | 3/1987 |
| CN | 103256337 | 8/2013 |

(Continued)

OTHER PUBLICATIONS

"International Search Report and Written Opinion of the International Searching Authority dated Apr. 28, 2017; International Application No. PCT/US2017/017559", dated Apr. 28, 2017.
(Continued)

*Primary Examiner* — Michael J Brown
(74) *Attorney, Agent, or Firm* — Womble Bond Dickinson (US) LLP

(57) ABSTRACT

Distributed static synchronous series compensators (DSSSCs) which may also be designated tower routers capable of injecting series inductive or capacitive impedances to enable distributed power-flow control. When a large number of these (a fleet of) DSSSCs are distributed over the grid for power-flow control, it is necessary to ensure that coordinated communication and control capabilities are also established, enabling fast reaction to changes that can exist across the grid. A system architecture and method for enabling localized high-speed low-latency intelligent control with communications between subsections (local network) of the grid along with communication to the central Grid operations center at the utility for supervisory control is disclosed herein. The architecture provides sub-cyclic
(Continued)

(<1/60 of a second) response capability, using the local DSSSCs with high-speed communication at the local network level to power-system disturbances, such as power-oscillation damping (POD), sub-synchronous resonance (SSR) etc.

14 Claims, 7 Drawing Sheets

Related U.S. Application Data

(60) Provisional application No. 62/294,230, filed on Feb. 11, 2016.

(52) U.S. Cl.
CPC ............... *Y02E 40/18* (2013.01); *Y02E 40/74* (2013.01); *Y04S 10/22* (2013.01)

(58) Field of Classification Search
USPC ........................................................ 700/295
See application file for complete search history.

(56) References Cited

U.S. PATENT DOCUMENTS

| | | |
|---|---|---|
| 3,556,310 A | 1/1971 | Loukotsky |
| 3,704,001 A | 11/1972 | Sloop |
| 3,750,992 A | 8/1973 | Johnson |
| 3,913,003 A | 10/1975 | Felkel |
| 4,025,824 A | 5/1977 | Cheatham |
| 4,057,736 A | 11/1977 | Jeppson |
| 4,103,853 A | 8/1978 | Bannan |
| 4,164,345 A | 8/1979 | Arnold et al. |
| 4,200,899 A | 4/1980 | Volman et al. |
| 4,277,639 A | 7/1981 | Olsson |
| 4,286,207 A | 8/1981 | Spreadbury et al. |
| 4,323,722 A | 4/1982 | Winkelman |
| 4,367,512 A | 1/1983 | Fujita |
| 4,514,950 A | 5/1985 | Goodson, Jr. |
| 4,562,360 A | 12/1985 | Fujimoto |
| 4,577,826 A | 3/1986 | Bergstrom et al. |
| 4,710,850 A | 12/1987 | Jahn et al. |
| 4,821,138 A | 4/1989 | Nakano et al. |
| 4,903,927 A | 2/1990 | Farmer |
| 5,006,846 A | 4/1991 | Granville et al. |
| 5,023,768 A | 6/1991 | Collier |
| 5,032,738 A | 7/1991 | Vithayathil |
| 5,193,774 A | 3/1993 | Rogers |
| 5,461,300 A | 10/1995 | Kappenman |
| 5,469,044 A | 11/1995 | Gyugyi et al. |
| 5,513,061 A | 4/1996 | Gelbien et al. |
| 5,610,501 A | 3/1997 | Nelson et al. |
| 5,648,888 A | 7/1997 | Le Francois et al. |
| 5,844,462 A | 12/1998 | Rapoport et al. |
| 5,884,886 A | 3/1999 | Hageli |
| 5,886,888 A | 3/1999 | Akamatsu et al. |
| 5,986,617 A | 11/1999 | McLellan |
| 6,088,249 A | 7/2000 | Adamson |
| 6,134,105 A | 10/2000 | Lueker |
| 6,147,581 A | 11/2000 | Rancourt et al. |
| 6,215,653 B1 | 4/2001 | Cochran et al. |
| 6,233,137 B1 | 5/2001 | Kolos et al. |
| 6,335,613 B1 | 1/2002 | Sen et al. |
| 6,486,569 B2 | 11/2002 | Couture |
| 6,727,604 B2 | 4/2004 | Couture |
| 6,831,377 B2 | 12/2004 | Yampolsky et al. |
| 6,895,373 B2 | 5/2005 | Garcia et al. |
| 6,914,195 B2 | 7/2005 | Archambault et al. |
| 7,090,176 B2 | 8/2006 | Chavot et al. |
| 7,091,703 B2 | 8/2006 | Folts et al. |
| 7,105,952 B2 | 9/2006 | Divan et al. |
| 7,193,338 B2 | 3/2007 | Ghali |
| 7,352,564 B2 | 4/2008 | Courtney |
| 7,460,931 B2 | 12/2008 | Jacobson |
| 7,642,757 B2 | 1/2010 | Yoon et al. |
| 7,688,043 B2 | 3/2010 | Toki et al. |
| 7,834,736 B1 | 11/2010 | Johnson et al. |
| 7,835,128 B2 | 11/2010 | Divan et al. |
| 7,932,621 B1 | 4/2011 | Spellman |
| 8,019,484 B2 | 9/2011 | Korba et al. |
| 8,249,836 B2 | 8/2012 | Yoon et al. |
| 8,270,558 B2 | 9/2012 | Dielissen |
| 8,310,099 B2 | 11/2012 | Engel et al. |
| 8,401,709 B2 | 3/2013 | Cherian et al. |
| 8,441,778 B1 | 5/2013 | Ashmore |
| 8,497,592 B1 | 7/2013 | Jones |
| 8,680,720 B2 | 3/2014 | Schauder et al. |
| 8,681,479 B2 | 3/2014 | Englert et al. |
| 8,816,527 B1 | 8/2014 | Ramsay et al. |
| 8,825,218 B2 | 9/2014 | Cherian et al. |
| 8,867,244 B2 | 10/2014 | Trainer et al. |
| 8,872,366 B2 | 10/2014 | Campion et al. |
| 8,890,373 B2 | 11/2014 | Savolainen et al. |
| 8,896,988 B2 | 11/2014 | Subbaiahthever et al. |
| 8,922,038 B2 | 12/2014 | Bywaters et al. |
| 8,957,752 B2 | 2/2015 | Sharma et al. |
| 8,996,183 B2 | 3/2015 | Forbes, Jr. |
| 9,099,893 B2 | 8/2015 | Schmiegel et al. |
| 9,124,100 B2 | 9/2015 | Ukai et al. |
| 9,124,138 B2 | 9/2015 | Mori et al. |
| 9,130,458 B2 | 9/2015 | Crookes et al. |
| 9,172,246 B2 | 10/2015 | Ramsay et al. |
| 9,178,456 B2 | 11/2015 | Smith et al. |
| 9,185,000 B2 | 11/2015 | Mabilleau et al. |
| 9,207,698 B2 | 12/2015 | Forbes, Jr. |
| 9,217,762 B2 | 12/2015 | Kreikebaum et al. |
| 9,246,325 B2 | 1/2016 | Coca Figuerola et al. |
| 9,325,173 B2 | 4/2016 | Varma et al. |
| 9,331,482 B2 | 5/2016 | Huang |
| 9,563,218 B2 | 2/2017 | Hall et al. |
| 9,659,114 B2 | 5/2017 | He et al. |
| 9,843,176 B2 | 12/2017 | Gibson et al. |
| 10,097,037 B2 * | 10/2018 | Inam .................. H02J 13/0006 |
| 2002/0005668 A1 | 1/2002 | Couture |
| 2002/0042696 A1 | 4/2002 | Garcia et al. |
| 2003/0006652 A1 | 1/2003 | Couture |
| 2003/0098768 A1 | 5/2003 | Hoffmann et al. |
| 2004/0153215 A1 | 8/2004 | Kearney et al. |
| 2004/0217836 A1 | 11/2004 | Archambault et al. |
| 2005/0052801 A1 | 3/2005 | Ghali |
| 2005/0073200 A1 | 4/2005 | Divan et al. |
| 2005/0194944 A1 | 9/2005 | Folts et al. |
| 2005/0205726 A1 | 9/2005 | Chavot et al. |
| 2006/0085097 A1 | 4/2006 | Courtney |
| 2007/0124026 A1 | 5/2007 | Troxell et al. |
| 2007/0135972 A1 | 6/2007 | Jacobson |
| 2007/0250217 A1 | 10/2007 | Yoon et al. |
| 2008/0103737 A1 | 5/2008 | Yoon et al. |
| 2008/0157728 A1 | 7/2008 | Toki et al. |
| 2008/0177425 A1 | 7/2008 | Korba et al. |
| 2008/0278976 A1 | 11/2008 | Schneider et al. |
| 2008/0310069 A1 | 12/2008 | Divan et al. |
| 2009/0243876 A1 | 10/2009 | Lilien et al. |
| 2009/0281679 A1 | 11/2009 | Taft et al. |
| 2010/0026275 A1 | 2/2010 | Walton |
| 2010/0177450 A1 | 7/2010 | Holcomb et al. |
| 2010/0213765 A1 | 8/2010 | Engel et al. |
| 2010/0302744 A1 | 12/2010 | Englert et al. |
| 2011/0060474 A1 | 3/2011 | Schmiegel et al. |
| 2011/0095162 A1 | 4/2011 | Parduhn et al. |
| 2011/0106321 A1 | 5/2011 | Cherian et al. |
| 2011/0172837 A1 | 7/2011 | Forbes, Jr. |
| 2012/0105023 A1 | 5/2012 | Schauder et al. |
| 2012/0146335 A1 | 6/2012 | Bywaters et al. |
| 2012/0205981 A1 | 8/2012 | Varma et al. |
| 2012/0242150 A1 | 9/2012 | Ukai et al. |
| 2012/0255920 A1 | 10/2012 | Shaw et al. |
| 2012/0293920 A1 | 11/2012 | Subbaiahthever et al. |
| 2013/0002032 A1 | 1/2013 | Mori et al. |
| 2013/0033103 A1 | 2/2013 | McJunkin et al. |
| 2013/0044407 A1 | 2/2013 | Byeon et al. |
| 2013/0094264 A1 | 4/2013 | Crookes et al. |
| 2013/0128636 A1 | 5/2013 | Trainer et al. |

(56) References Cited

U.S. PATENT DOCUMENTS

| | | |
|---|---|---|
| 2013/0166085 A1 | 6/2013 | Cherian et al. |
| 2013/0169044 A1 | 7/2013 | Stinessen et al. |
| 2013/0182355 A1 | 7/2013 | Coca Figuerola et al. |
| 2013/0184894 A1 | 7/2013 | Sakuma et al. |
| 2013/0200617 A1 | 8/2013 | Smith et al. |
| 2013/0249321 A1 | 9/2013 | Gao et al. |
| 2013/0277082 A1 | 10/2013 | Hyde et al. |
| 2013/0345888 A1 | 12/2013 | Forbes, Jr. |
| 2014/0008982 A1 | 1/2014 | Powell et al. |
| 2014/0025217 A1 | 1/2014 | Jin et al. |
| 2014/0032000 A1 | 1/2014 | Chandrashekhara et al. |
| 2014/0111297 A1 | 4/2014 | Earhart et al. |
| 2014/0129195 A1 | 5/2014 | He et al. |
| 2014/0132229 A1 | 5/2014 | Huang |
| 2014/0153383 A1 | 6/2014 | Mabilleau et al. |
| 2014/0188689 A1 | 7/2014 | Kalsi et al. |
| 2014/0203640 A1 | 7/2014 | Stinessen |
| 2014/0210213 A1 | 7/2014 | Campion et al. |
| 2014/0246914 A1 | 9/2014 | Chopra et al. |
| 2014/0247554 A1 | 9/2014 | Sharma et al. |
| 2014/0266288 A1 | 9/2014 | Trabacchin et al. |
| 2014/0268458 A1 | 9/2014 | Luciani et al. |
| 2014/0312859 A1 | 10/2014 | Ramsay et al. |
| 2014/0327305 A1 | 11/2014 | Ramsay et al. |
| 2014/0347158 A1 | 11/2014 | Goeke et al. |
| 2014/0371929 A1 | 12/2014 | Allen et al. |
| 2015/0012146 A1 | 1/2015 | Cherian et al. |
| 2015/0029764 A1 | 1/2015 | Peng |
| 2015/0051744 A1 | 2/2015 | Mitra |
| 2015/0184415 A1 | 7/2015 | Bushore |
| 2015/0226772 A1 | 8/2015 | Kreikebaum et al. |
| 2015/0244307 A1 | 8/2015 | Cameron |
| 2015/0270689 A1 | 9/2015 | Gibson et al. |
| 2016/0036231 A1 | 2/2016 | Ramsay et al. |
| 2016/0036341 A1 | 2/2016 | Jang et al. |
| 2017/0163036 A1 | 6/2017 | Munguia et al. |
| 2017/0169928 A1 | 6/2017 | Carrow et al. |

FOREIGN PATENT DOCUMENTS

| | | |
|---|---|---|
| CN | 203668968 | 6/2014 |
| EP | 2533399 | 12/2012 |
| JP | 2002-199563 | 7/2002 |
| JP | 2005-045888 | 2/2005 |
| JP | 2015-086692 | 5/2015 |
| KR | 10-1053514 | 8/2011 |
| WO | WO-2008/082820 | 7/2008 |
| WO | WO-2014/035881 | 3/2014 |
| WO | WO-2014/074956 | 5/2014 |
| WO | WO-2014/099876 | 6/2014 |
| WO | WO-2015/074538 | 5/2015 |
| WO | WO-2015/119789 | 8/2015 |

OTHER PUBLICATIONS

"International Search Report and Written Opinion of the International Searching Authority dated Apr. 3, 2017; International Application No. PCT/US2016/063200", dated Apr. 3, 2017.
"Invitation to Pay Additional Fees dated Jan. 18, 2017; International Application No. PCT/US2016/063200", dated Jan. 18, 2017.
"Notice of Allowance dated May 23, 2018; U.S. Appl. No. 15/068,397", dated May 23, 2018.
"Office Action dated Aug. 10, 2018; U.S. Appl. No. 15/428,906", dated Aug. 10, 2018.
"Office Action dated Jan. 4, 2018; U.S. Appl. No. 15/068,397", dated Jan. 4, 2018.
Albasri, Fadhel A. et al., "Performance Comparison of Distance Protection Schemes for Shung-Facts Compensated Transmission Lines", IEEE Transactions on Power Delivery, vol. 22, No. 4, Oct. 2007, pp. 2116-2125.
Amin, S. M. et al., "Toward a Smart Grid: Power Delivery for the 21st Century", IEEE power & energy magazine, vol. 3, No. 5, Sep./Oct. 2005, pp. 34-41.
Angeladas, Emmanouil , "High Voltage Substations Overview (part 1)", Siemens, Jan. 24, 2013, pp. 1-8.
Aquino-Lugo, Angel A. , "Distributed and Decentralized Control of the Power Grid", Ph.D. Dissertation, University of Illinois at Urbana-Champaign, 2010, 172 pp. total.
Bhaskar, M. A. et al., "Impact of FACTS devices on distance protection in Transmission System", 2014 IEEE National Conference on Emerging Trends in New & Renewable Energy Sources and Energy Management (NCET NRES EM), Dec. 16, 2014, pp. 52-58.
Dash, P. K. et al., "Digital Protection of Power Transmission Lines in the Presence of Series Connected FACTS Devices", IEEE Power Engineering Society Winter Meeting, 2000, pp. 1967-1972.
Divan, D. M. , "Nondissipative Switched Networks for High-Power Applications", Electronics Letters, vol. 20, No. 7, Mar. 29, 1984, pp. 277-279.
Funato, Hirohito et al., "Realization of Negative Inductance Using Variable Active-Passive Reactance (VAPAR)", IEEE Transactions on Power Electronics, vol. 12, No. 4, Jul. 1997, pp. 589-596.
Gyugyi, Laszlo et al., "Status Synchronous Series Compensator: A Solid-State Approach to the Series Compensation of Transmission Lines", IEEE Transactions on Power Delivery, vol. 12, No. 1, Jan. 1997, pp. 406-417.
Gyugyi, Laszlo et al., "The Interline Power Flow Controller Concept: A New Approach to Power Flow Management in Transmission Systems", IEEE Transactions on Power Delivery, vol. 14, No. 3, Jul. 1999, pp. 1115-1123.
Kavitha, M. et al., "Integration of FACTS into Energy Storage Systems for Future Power Systems Applications", International Journal of Advanced Research in Electrical, Electronics and Instrumentation Engineering, vol. 2, Issue 2, Feb. 2013, pp. 800-810.
Kumbhar, Mahesh M. et al., "Smart Grid: Advanced Electricity Distribution Network", IOSR Journal of Engineering (IOSRJEN), vol. 2, Issue 6, Jun. 2012, pp. 23-29.
Lambert, Frank C. , "Power Flow Control", ISGT Europe, 2014, Istanbul, Turkey, Oct. 13, 2014, pp. 1-15.
Lehmkoster, Carsten , "Security Constrained Optimal Power Flow for an Economical Operation of FACTS-Devices in Liberalized Energy Markets", IEEE Transactions on Power Delivery, vol. 17, No. 2, Apr. 2002, pp. 603-608.
Mali, Bhairavanath N. et al., "Performance Study of Transmission Line Ferranti Effect and Fault Simulation Model Using MATLAB", International Journal of Innovative Research in Electrical, Electronics, Instrumentation and Control Engineering, vol. 4, Issue 4, Apr. 2016, pp. 49-52.
Mutale, Joseph et al., "Transmission Network Reinforcement Versus FACTS: An Economic Assessment", IEEE Transactions on Power Systems, vol. 15, No. 3, Aug. 2000, pp. 961-967.
Ramchurn, Sarvapali D. et al., "Putting the 'Smarts' into the Smart Grid: A Grand Challenge for Artificial Intelligence", Communications of the ACM, vol. 55, No. 4, Apr. 2012, pp. 86-97.
Reddy, D. M. et al., "FACTS Controllers Implementation in Energy Storage Systems for Advanced Power Electronic Applications—A Solution", American Journal of Sustainable Cities and Society, Issue 2, vol. 1, Jan. 2013, pp. 36-63.
Renz, B. A. et al., "AEP Unified Power Flow Controller Performance", IEEE Transactions on Power Delivery, vol. 14, No. 4, Oct. 1999, pp. 1374-1381.
Ribeiro, P. et al., "Energy Storage Systems", Chapters 1-2.4 of Section entitled "Energy Storage Systems" in Electrical Engineering—vol. III, edited by Kit Po Wong, Encyclopedia of Life Support Systems (EOLSS) Publications, Dec. 13, 2009, 11 pp. total.
Samantaray, S. R. , "A Data-Mining Model for Protection of FACTS-Based Transmission Line", IEEE Transactions on Power Delivery, vol. 28, No. 2, Apr. 2013, pp. 612-618.
Schauder, C. D. et al., "Operation of the Unified Power Flow Controller (UPFC) Under Practical Constraints", IEEE Transactions on Power Delivery, vol. 13, No. 2, Apr. 1998, pp. 630-639.
Siemens SAS, , "Portable Power Solutions, "Plug and play" High Voltage E-Houses, skids and mobile high voltage substations up to 420 kV", Nov. 2015, 8 pp. total.
Swain, S. C. et al., "Design of Static Synchronous Series Compensator Based Damping Controller Employing Real Coded Genetic

(56) References Cited

OTHER PUBLICATIONS

Algorithm", International Journal of Electrical, Computer, Energetic, Electronic and Communication Engineering, vol. 5, No. 3, 2011, pp. 399-407.

Xue, Yiyan et al., "Charging Current in Long Lines and High-Voltage Cables—Protection Application Considerations", 67th Annual Georgia Tech Protective Relaying Conference, Atlanta, Georgia, May 8-10, 2013, pp. 1-17.

"Notice of Allowance dated Oct. 11, 2018; U.S. Appl. No. 15/428,906", dated Oct. 11, 2018.

"Supplementary European Search Report dated Jul. 25, 2019; European Patent Application No. 16890099.1", dated Jul. 25, 2019.

"Supplementary European Search Report dated Jul. 25, 2019; European Patent Application No. 17750918.9", dated Jul. 25, 2019.

* cited by examiner

SYSTEM AND METHOD FOR DISTRIBUTED GRID CONTROL WITH SUB-CYCLIC LOCAL RESPONSE CAPABILITY

CROSS-REFERENCE TO RELATED APPLICATIONS

This application is a continuation of U.S. patent application Ser. No. 15/068,397 filed Mar. 11, 2016, which claims the benefit of U.S. Provisional Patent Application No. 62/294,230 filed Feb. 11, 2016, the entireties of which are incorporated herein by reference.

BACKGROUND OF THE INVENTION

1. Field of the Invention

The present invention relates to systems for distributed control with hierarchical supervision of the power grid when using a plurality of self-aware distributed power flow controllers.

2. Prior Art

Most power utilities use centralized energy management systems (EMS) and supervisory control and data acquisition (SCADA) systems for control of the power grid systems. These control systems provide communication and control between any of the following at the various geographically-distributed sub-stations and the centrally-located EMS:
  remote terminal units;
  breakers;
  phase-shifting transformers;
  analog and digital sensing devices;
  FACTS (Flexible AC Transmission Systems and Sub-systems).

One problem of this type of centralized control is the inherent delay to and from the EMS. This delay can easily reach three to five seconds, and may even be as long as a minute under certain cases. This limits the responsiveness of the EMS-based grid control system to disturbances in the system. The recent inclusion of plurality of distributed power generation, such as local solar generators and wind-farms, have increased the need for fast optimization of power transfer and fast response to disturbances on the grid, a basic necessity for smoother operation of the power grid.

A fixed substation-based response and control system 200 has been proposed for Flexible AC Transmission System (FACTS) for improved control of the power grid. Such a system is shown in FIG. 2. This system provides a better response capability to the disturbances and perturbations of the high-voltage Transmission grid 202 using static synchronous series compensator (SSSC) at substations 204. Though these SSSCs are able to provide fast response to disturbances recognized, it being a non-distributed system, with communication link 207 to central utility 206 for control inputs and data analysis. This limits the capability of the system by adding delays for detection of problem, delays in communication, and delays for decision, before action can be initiated. This reduces the capability for the system for really fast proactive and interactive responses to local-level perturbations and oscillations of the grid from distributed generators 203, loads 205 or disturbances on the HV transmission lines 202 suspended on transmission towers 201 due to current in-balances, wind-related voltage perturbations due to rapid energy injections, or wind-turbine controls-related resonances etc.

Of recent, distributed control of power flow over the high-voltage (HV) transmission lines using distributed impedance injection modules, has been proposed and is being implemented. FIG. 1 is an exemplary block diagram 102 of such distributed control modules that are static inductive- or capacitive impedance-injection modules 100, attached directly to the HV transmission line 108 transferring power from generator 104 to distribution point 106. A safer and more reliable way to attach the modules has been shown to be to suspend the distributed static impedance-injection modules from the transmission towers. These self-aware static inductive or capacitive impedance-injection modules are then able to identify and react very fast to the changes in the power line characteristics of the individual HV transmission lines 108 to which these are attached at a local level. These intelligent devices, are capable of injecting inductive or capacitive impedances on to the HV transmission lines 108 and hence provide the capability to have localized control of line current, and therefore establish a level of power-flow control on the HV transmission lines.

BRIEF DESCRIPTION OF THE DRAWINGS

The drawings are made to point out and distinguish the invention from the prior art. The objects, features and advantages of the invention are detailed in the description taken together with the drawings.

DETAILED DESCRIPTION OF THE PREFERRED EMBODIMENTS

Figure 1:
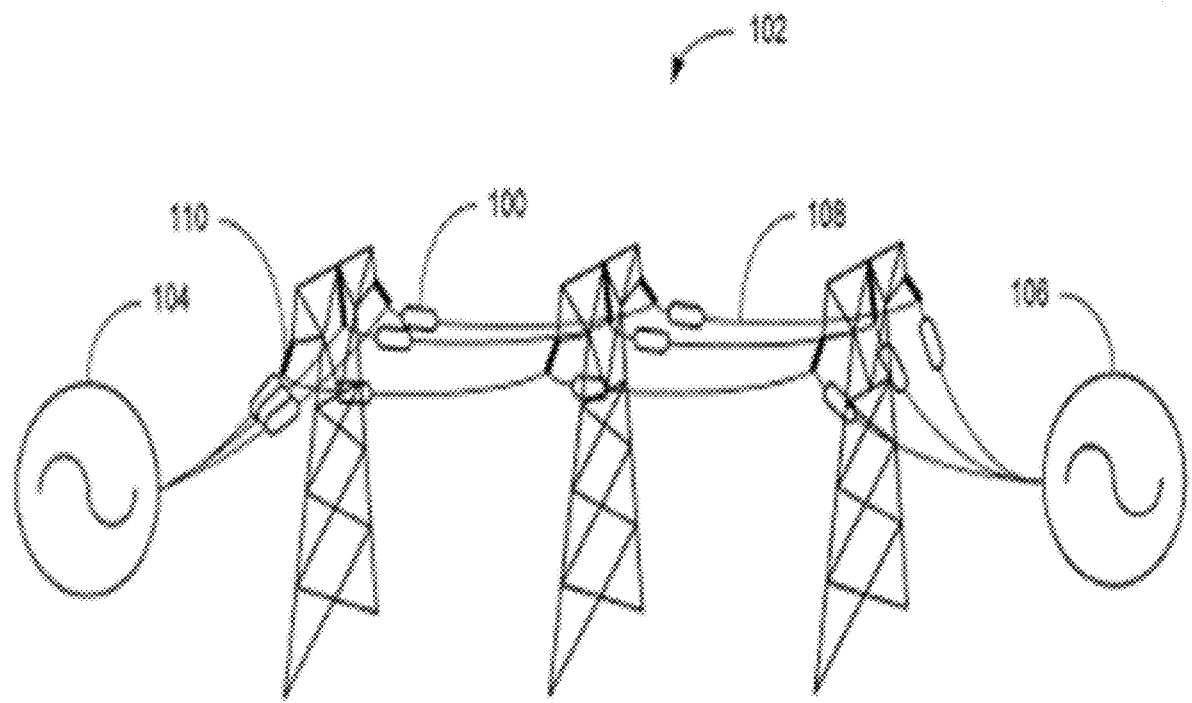
FIG. 1 is an exemplary block diagram of the distributed control modules attached directly to the HV transmission lines.
Figure 2:
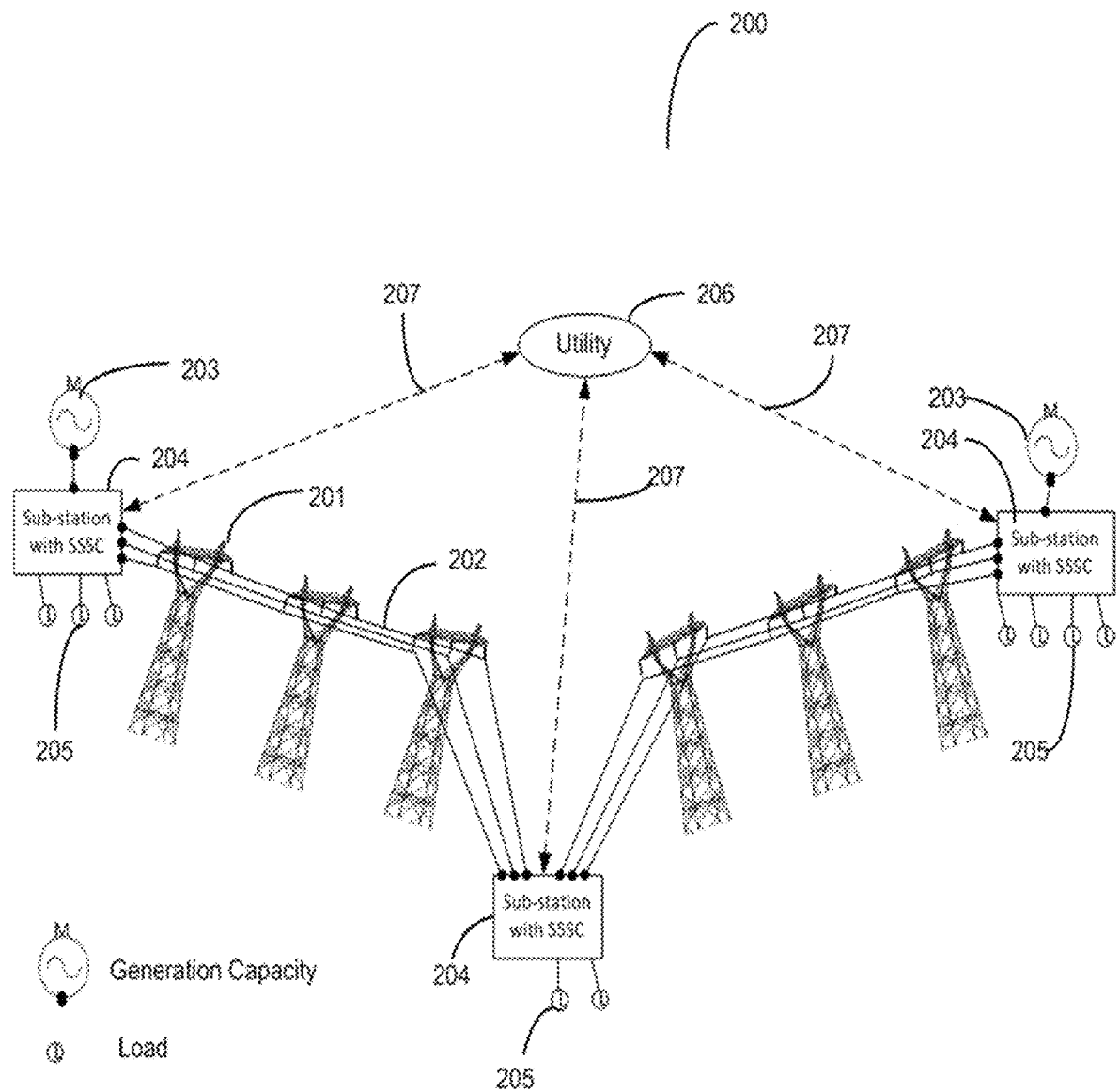
FIG. 2 is a schematic of an alternate non-distributed control system based in substations with customized Static Series Synchronous compensators (SSSC) for grid control.

It will be very useful to have the capability of the intelligent, self-aware impedance injection devices to be extended by using self-aware and intelligent distributed static synchronous series compensators (DSSSCs) attached to the individual transmission lines and suspended from the transmission towers as tower routers (TRs). These DSSSCs will be able to provide distributed capability for control of the power grid. By making the DSSSCs dynamic, intelligent and self-aware and linking these DSSSCs into an interconnected hierarchical system, the capability to react to changes in the power grid faster may be established. Such a system if implemented with capability for fast response at the local level, fast communication between system elements in the neighborhood, and information transfer capability from the local centers to the main control centers will be very advantageous for optimizing the power grid. Also having such a system with local response capability for computation and control of the distribution grid as well, will be useful in establishing a complete self-aware and self-healing grid system encompassing generation, transmission and distribution. Such a system if all the sub-system elements can be made self aware and intelligent, should be able to optimize the grid operation, speed-up recovery from problems and disturbances and improve overall grid operational efficiency.

The invention disclosed is generally directed toward providing very high reliability distributed active control capabilities for sub-cyclic power grid control. The invention uses the capability of DSSSC or tower router (TR) technology that is being implemented by the applicant entity for fast localized power flow balancing across the multiple high-voltage lines used for power distribution on high-voltage transmission grids. Active power flow control modules that are intelligent, self-aware DSSSCs are placed in a distributed fashion on segments of high-voltage lines to provide localized control of the segments of the power lines. The co-pending patent applications "Voltage or impedance-injection method using transformers with multiple secondary windings for dynamic power flow control" filed as U.S. Provisional Patent Application No. 62/264,744 on Dec. 7, 2015 and "Transformers with multi-turn primary windings for dynamic power flow control" filed as U.S. Provisional Patent Application No. 62/264,739 on Dec. 7, 2015 cover the functional aspects of distributed active impedance injection modules that are usable with the addition of dynamic sensing and control capability and high-speed communication capability as self-aware DSSSCs. These provisional applications assigned to the current entity, are herewith incorporated herein by reference. The present invention is focused on developing a closed-loop distributed sub-cyclic solution to address the monitoring and control need that exists for high-voltage transmission grids using these self-aware DSSSCs. In addition to steady-state power-flow control and responsive line-current balancing, the use of the distributed self-aware DSSSCs with the added high-speed communication capability implemented by the present invention, enable transient and small-signal stability, power-oscillation damping (POD) and sub-synchronous resonance (SSR) damping. These capabilities for fast responses to instabilities of the grid improve and optimize the efficiency, stability and power transfer capabilities of the transmission grid.

The four main needs that have been defined to achieve the above include:
1. The need to have distributed control modules, DSSSCs, attached to the transmission lines that are intelligent and self-aware, and can react independently to disturbances on the local transmission lines of the grid. The distributed DSSSCs developed by the inventors and assigned to the inventor's parent organization meets the above requirement with a few modifications.
2. The second need is to provide local high-speed interconnect and communication between the DSSSCs and a local supervising controller to enable coordination of action between the local DSSSCs to overcome/limit the disturbances within the local control area of the grid.
3. A high-speed inter-link between local supervisory controllers, for keeping the near local controllers apprised of the nature of the disturbances and responses in the local area enable proactive response from these neighboring regions if it becomes necessary.
4. A communication link inter-connecting the supervisory modules with the utility central supervisory control is used to enable power flow diversion, or other major remedial action.

Sub-cyclic dynamic control has been identified as an essential need to have a stable and dynamic power grid. The grid system should be able to handle issues of stability, intermittency and transients that are inherent in the new distributed, localized renewable power generation and distribution that is becoming part of the power grid. In order for the grid to be stable under these conditions it is necessary for the response actions to disturbances on the grid to be within milliseconds to prevent these from growing into major issues that can take the grid down. Centralized control of the grid using high-level algorithms and modeling used for grid control is not efficient in this regard due to the time delays inherently associated with the detection, communication, decision and action. The solution to this problem is intelligent distributed power-flow controllers such as the distributed intelligent dynamic impedance injection modules with fast intercommunication capability with sufficient intelligence and computing capability, such as implemented in the DSSSCs, to locally respond to any sensed disturbance in a sub-cyclic time frame. The capability for local data collection analysis and coordination between a plurality of such dynamic impedance injection modules are implemented by local intelligent controllers having high-speed communication links to the distributed dynamic intelligent impedance injection modules. These local intelligent controllers are used to enhance the capability of the distributed intelligent dynamic impedance injection modules. These local intelligent controllers are also enabled to communicate and coordinate with each other to enhance the overall capability of grid control and analysis of problems in a sub-cyclic time frame. The local intelligent controllers also coordinate with the system utility control center (housing the EMS) to provide the system utility with consolidated data and status information and receive commands and responses for implementation by the distributed intelligent dynamic impedance injection modules in case of system-level problems on the grid.

Figure 3A:
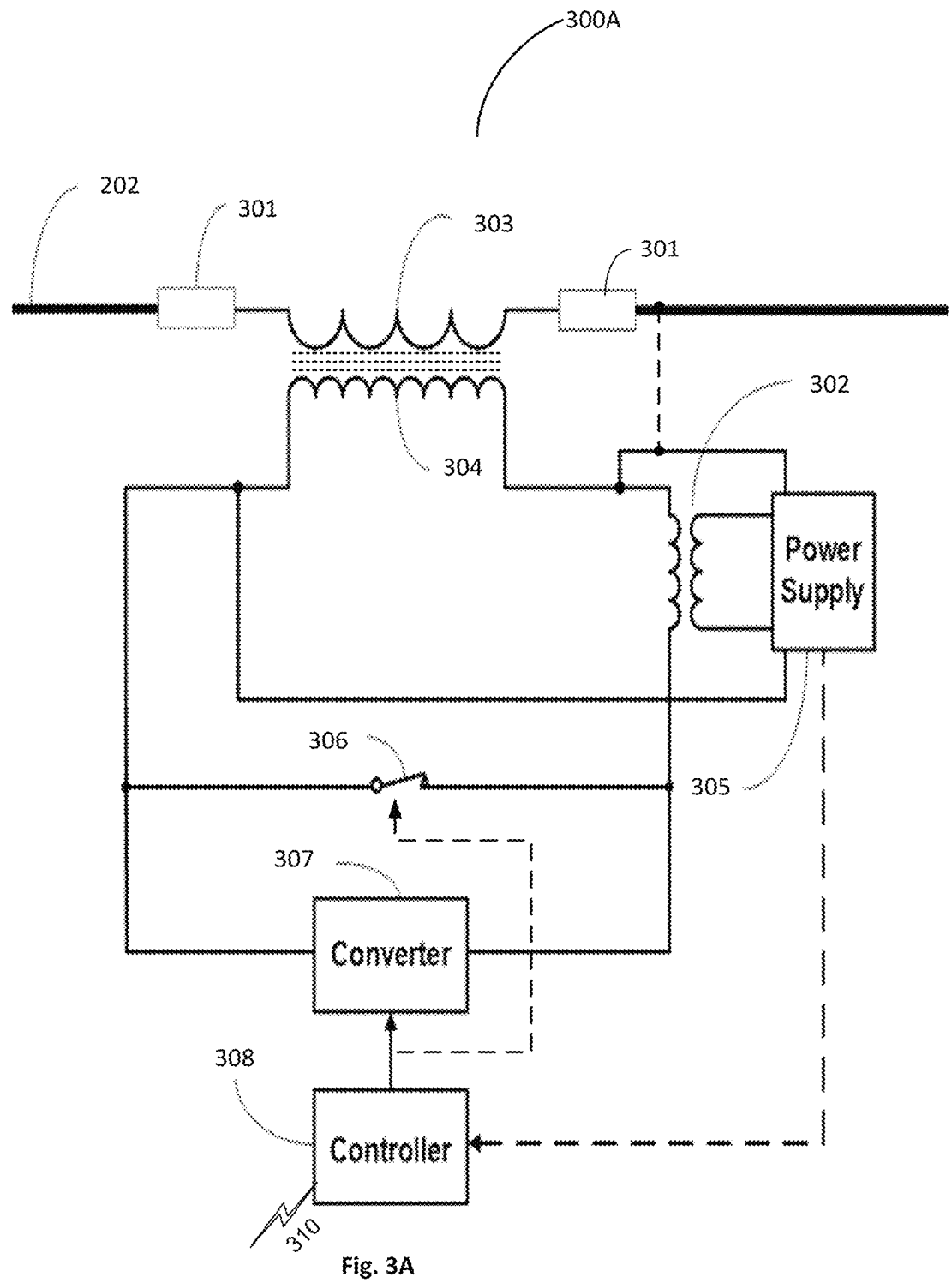
FIGS. 3A and 3B are exemplary schematic diagram of intelligent and self-aware DSSSCs with fast communication capability.
Figure 3B:
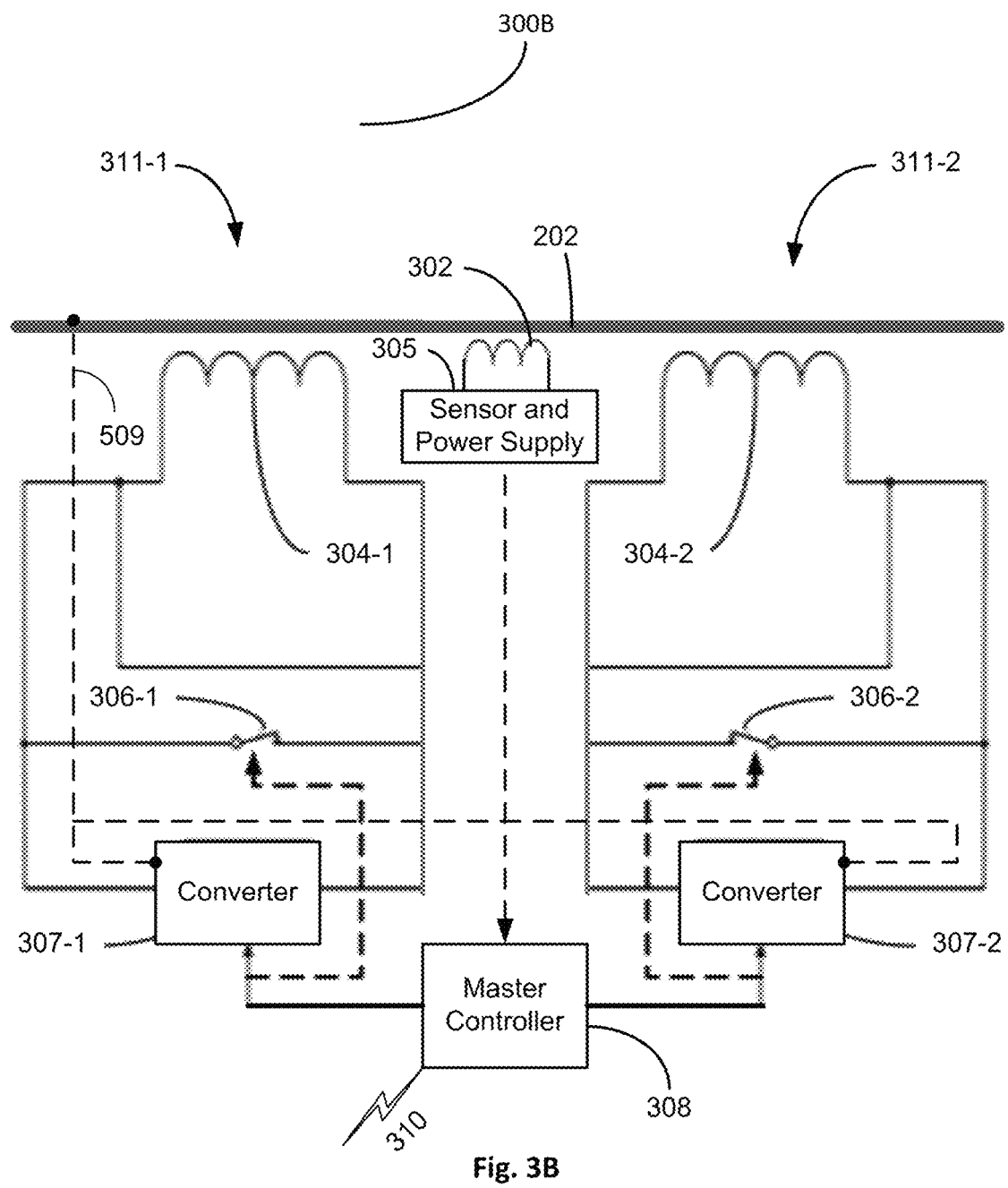
Figure 4:
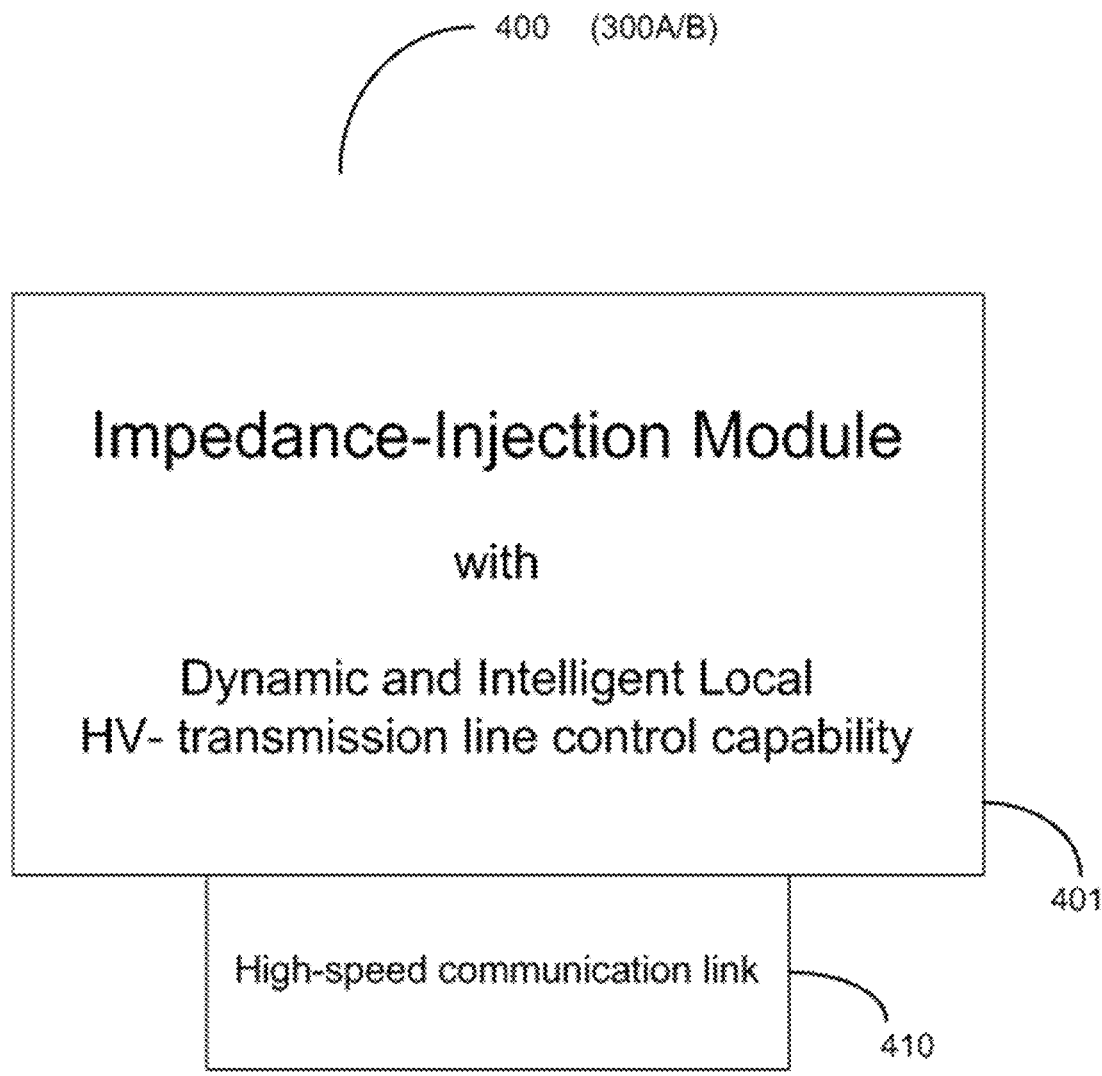
FIG. 4 is an exemplary block diagram of an intelligent and self-aware DSSSC with fast communication capability.

FIG. 3A and FIG. 3B are exemplary block schematic diagrams of exemplary distributed intelligent impedance-injection modules or DSSSCs as per the present invention. The exemplary intelligent impedance-injection modules of the previously mentioned U.S. Provisional Patent Applications Nos. 62/264,739 and 62/264,744, are modified into DSSSCs by adding dynamic control capabilities and high-speed local communication capabilities. FIG. 4 is an exemplary block diagram of such a DSSSC. The impedance injection module 401 with built-in dynamic intelligent local HV transmission line monitoring and control capabilities is modified by the addition of high-speed local communication capabilities 410 to convert these to computation-and-dynamic-response capable DSSSCs 300A and 300B of FIGS. 3A and 3B.

FIG. 3A is the block schematic of an implementation of intelligent distributed DSSSC 300A that has a multi-turn primary 303 connected in series with the high-voltage (HV) transmission line 202 by cutting and splicing 301. A secondary winding 304 couples to the primary and has electronic impedance generation circuits comprising a converter 307. The converter 307 is capable of generating either leading or lagging voltages to be impressed on the HV transmission line 202. The decision of which voltage type is needed is controlled by an intelligent local controller 308 that senses inputs from the secondary winding via a transformer connected to the HV transmission line and also obtains commands from either the EMS or the localized controller, as proposed here. The controller 308 also has a transceiver that enables high-speed communication 310 with neighboring DSSSCs by connecting to their controllers for intelligently coordinating the responses to identified local disturbances. It is also enabled for receiving control inputs, data collection and feedback to central or local control units that enable coordinated response for the grid segment or the grid system in case of problems. A transformer 302 with the power supply unit 305 is enabled to extract power from the line for driving the electronic components in the secondary 304 circuit of the injection transformer. The DSSSC 300A is enabled to intelligently generate and inject inductive or capacitive impedances of appropriate magnitude on to the HV transmission line via the injection transformer.

FIG. 3B is an alternate exemplary embodiment of the DSSSC 300B having a plurality of secondary windings 304-1 and 304-2 coupled directly to the HV transmission line used as a single-turn or multi-turn primary. A converter 307-x that is capable of producing dynamic impedance of inductive or capacitive voltages is attached to each of the secondary windings. A second transformer that has a secondary winding 302 coupled to the HV transmission line 202 is connected to a power supply unit 305. The power supply unit extracts power from the HV transmission line and supplies the power to the circuits connected on the secondary side of the injection transformers 304-1 and 304-2. The DSSSC senses the current and the grid disturbances over the transmission line through ancillary sensing equipment and generates appropriate responses as voltages that are orthogonal to the line currents as impedances to be injected onto the transmission line. The master controller 308 coordinates the generation of the injected impedances by the plurality of converters 307-x of the tower router module. The master controller 308 also incorporates a transceiver with high-speed communication capability, which transceiver enables communication with neighboring DSSSC controllers for intelligently coordinating the responses to disturbances. The transceiver is also enabled for receiving control inputs, and for data collection and feedback to central or local control units that enable coordinated responses for the grid system in case of problems.

Figure 5:
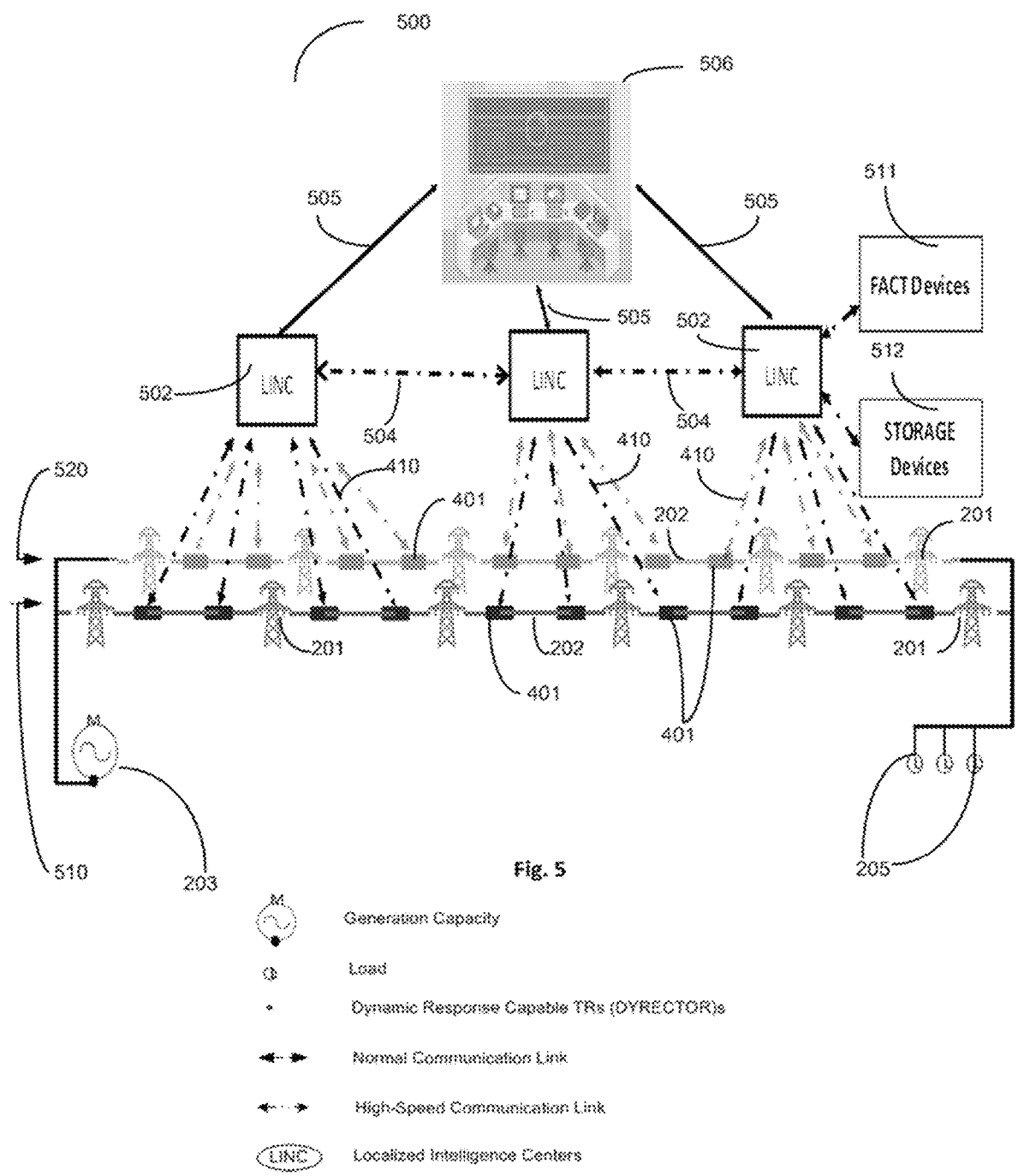
FIG. 5 is an exemplary schematic diagram of the distributed and hierarchical intelligent control system for the grid as per the current invention.

FIG. 5 is an exemplary block schematic of the grid control and optimization system 500 as per the disclosed invention. The system 500 comprise the dynamic response capable DSSSCs (DYRECTORs) 400 of FIG. 4, that are used as distributed injection modules for line balancing and steady-state power flow control. These DYRECTORs 400 are enabled to communicate using built-in high-speed links 410 between other DYRECTORs in the local area. A set of localized intelligent centers (LINC)s 502, at least one each for each local area, are also enabled with high-speed communication capabilities to accept data and status inputs from and to provide intelligent coordinated control capability, via communication links 410, for the activities of the DYRECTORs in the local area when necessary. The LINCs 502 of adjacent local areas are also able to communicate with each other using their high-speed communication links 504 to intelligently respond to disturbances on the high-voltage transmission lines at sub-cyclic speeds. The LINCs 502 are able to provide necessary local supervisory control and coordination to a plurality of transmission line groups 510 and 520. The use of the DYRECTORs 400 and the LINCs 502 combination enables optimization of performance of the power grid system 500 by receiving their status information and coordinating the response at ultra-high speeds to optimize power transfer, line balancing and respond at sub-cyclic speeds to identified disturbances of the power grid. The LINCs 502 also function to aggregate the collected grid status and performance data for transmission to utility control. The LINCs 502 also provide the capability to run computationally intensive calculations locally to support the operation of the DYRECTORs 400. The LINCs 502 use normal communication links 505 to system utility 506 for transferring aggregated status data and activity information and for receiving control instructions from the system utility 506 for the distributed components of the grid control and optimization system 500.

By having intelligence and computational capability built into the individual DYRECTORs 400 and LINCs 502 enable decisions to be taken by these devices, when a problem on the power grid system 500 is sensed and identified, without waiting for the data to be transmitted to the utility control 506 and instructions to arrive from the utility control 506 with concomitant delays. The system 500 disclosed is hence able to handle problems of distribution, including those related to other FACT devices 511 and storage systems 512 attached at the grid edge, and generation such as distributed generation by green energy systems as well as problems associated with transmission of power over the power grid very effectively locally when appropriate, and under utility control when needed.

Figure 6:
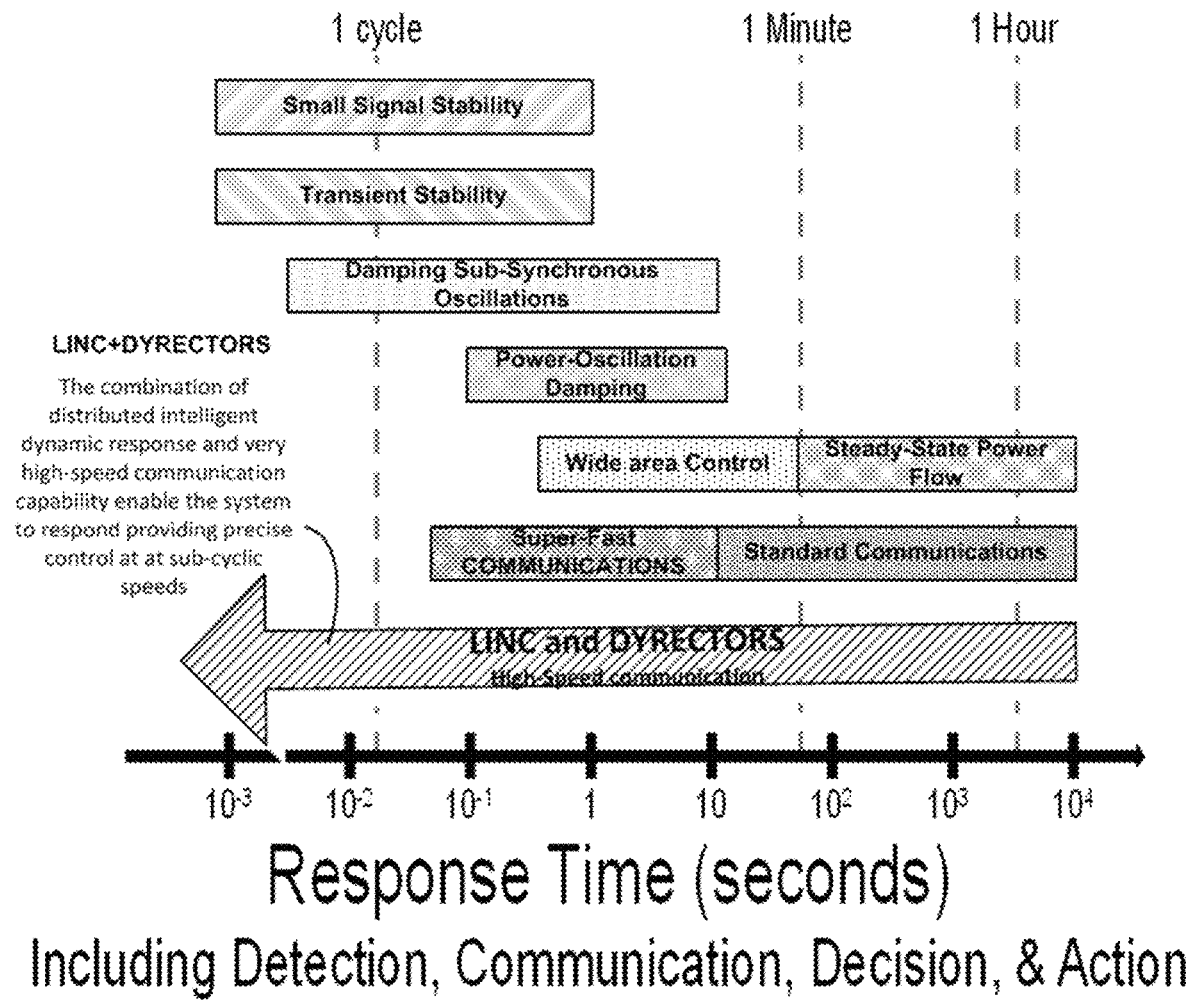
FIG. 6 is an exemplary assessment of the response need and the capability of the current invention to respond to problems of the grid.

FIG. 6 shows the required response times, comprising time for detection, communication, decision and responsive action, applicable for typical problems on a modern power grid system 500. Typical steady-state power-flow control is the only problem that can be optimally handled without a distributed control capability using normal communication speeds. In order for the power grid system to handle problems associated with wide-area control of the grid and power oscillation, it has been shown that high-speed communication capabilities are required. The problems of small-signal stability, transient stability and sub-synchronous oscillations, require the sub-cyclic local response capability provided by the DYRECTORs 400 and LINCs 502 that comprise localized intelligence incorporated in the units for detection, computation and controlled response, with high-speed communication to establish coordinated response with neighboring local area controllers.

The disclosed power grid system 500 is hence able to respond optimally and at high-speed to any of the disturbances on the grid, as well as monitoring and controlling general operation of the grid, such as, but not limited to, line balancing, harmonic reduction or elimination and all the other characteristics to be monitored and controlled, all of which are collectively referred to a "conditions" or conditions on the high-voltage transmission lines of the power grid in the claims to follow.

Even though the invention disclosed is described using specific implementations, circuits and components, it is intended only to be exemplary and non-limiting. The practitioners of the art will be able to understand and modify the same based on new innovations and concepts, as they are made available. The invention is intended to encompass these modifications.

What is claimed is:

1. A system for hierarchical monitoring and control for a high-voltage power grid comprising:
    i) a plurality of high-voltage transmission lines carrying power from generation locations to distribution centers;
    ii) a plurality of impedance injection modules distributed over, and coupled to, the high-voltage transmission lines of the power grid, each impedance injection module coupled to only one high voltage transmission line of the power grid, and comprises:
        a controller that senses disturbances on the high-voltage transmission line and reacts by generating and injecting inductive and/or capacitive impedances of appropriate magnitude onto the high-voltage transmission line via an injection transformer coupled to the high-voltage transmission line; and a transceiver for high-speed communication with other impedance injection modules within a local group of impedance injection modules to enable coordinated response of the other impedance injection modules within the respective local group of impedance injection modules to disturbances on the high-voltage transmission line;

iii) a group of local centers, each local center within the group of local centers having a high-speed transceiver for high-speed communication with impedance injection modules within a respective local group of impedance injection modules and with other local centers to enable coordinated response of all impedance injection modules associated with that group of local centers; and iv) a communication link to and from a system utility, at each local center, for communication at a lower speed than the high-speed communication between impedance injection modules and between impedance injection modules and local centers.

2. The high-voltage power grid of claim 1 wherein the controller of each impedance injection module provides a sub-cyclic response capability of that impedance injection module.

3. The high-voltage power grid of claim 1 wherein the controller of each impedance injection module provides a sub-cyclic response capability of that impedance injection module and to other impedance injection modules within the local group of impedance injection modules using the high-speed communication between impedance injection modules within the respective local group.

4. A high-voltage power grid system with hierarchical control capability comprising:

a plurality of impedance injection modules distributed over and coupled to a plurality of high-voltage transmission lines, each impedance injection module having:

a controller that senses disturbances on the high-voltage transmission line, to which it is coupled, and reacts by generating and injecting inductive and/or capacitive impedances of appropriate magnitude onto the high-voltage transmission line via an injection transformer coupled to the high-voltage transmission line, the controller providing a sub-cyclic response capability of the respective impedance injection module; and a transceiver for high-speed communication with other impedance-injection modules within a local group of impedance injection modules to enable coordinated response of the other impedance-injection modules within the respective local group of impedance injection modules to disturbances on the high-voltage transmission lines;

a group of local centers, each local center within the group of local centers having a high-speed transceiver for high-speed communication with impedance injection modules within a respective local group of impedance injection modules and with other local centers to enable coordinated response of all impedance-injection modules associated with that group of local centers; and each local center further including a communication link to and from a system utility, to receive instructions from the system utility, provide feedback to the system utility, and coordinate activity across the grid when required.

5. The high-voltage power grid of claim 4 wherein the communication link to and from a system utility is for communication at a lower speed than the high-speed communication between impedance injection modules and between impedance injection modules and local centers.

6. The high-voltage power grid of claim 4 wherein the controller of each impedance injection module enables a sub-cyclic response capability to other impedance-injection modules within the local group of impedance injection modules, to sensed disturbances, using the high-speed communication between impedance-injection modules within the respective local group.

7. A high-voltage power grid having a distributed sensing and control ability with hierarchical supervision of the power grid comprising:

a plurality of impedance-injection modules distributed over and coupled to a plurality of high-voltage transmission lines of the high-voltage power grid, each impedance injection module having a capability to sense disturbances and respond to correct the sensed disturbances on the respective transmission lines of the power grid to which it is coupled;

each impedance injection module also having a transceiver for high-speed communication with other impedance-injection modules within a local group of impedance injection modules to enable coordinated high-speed response to disturbances on the high-voltage transmission line by the local group of impedance injection modules;

a group of local centers, each local center comprising the local group of communicably interconnected impedance injection modules, each local center also having a high-speed transceiver for high-speed communication with the local group of impedance injection modules, and for high speed communication with other local neighboring centers to enable coordinated response of all impedance-injection modules associated with that group of local centers;

each local center also having a communication link to and from a system utility;

wherein the distributed control with hierarchical supervision of the high-voltage power grid provides for steady-state power-flow control, line-current balancing, transient and small-signal stability, power-oscillation damping (POD), and sub-synchronous resonance (SSR) damping.

8. The high-voltage power grid of claim 7, wherein the communication link to and from the local center to the system utility is a slower link than the high-speed communication link of the local center with the local group of impedance injection modules, and the high speed communication link of the local center with other local neighboring centers.

9. The high-voltage power grid of claim 7, wherein the distributed sensing and response capability of each distributed impedance injection module allow sub-cyclic response to disturbances sensed locally.

10. The high-voltage power grid of claim 7, wherein the high-speed communication link between impedance injection modules of a local group of impedance injection modules enable the local group of impedance injection modules to respond in coordination and at sub-cyclic speeds to disturbances sensed on the transmission lines.

11. The high-voltage power grid of claim 7, wherein the high-speed communication capability at each local center of the group of local centers, for high-speed communication with the local group of impedance injection modules, and for high speed communication with other local neighboring centers enable coordinated sub-cyclic response of all impedance-injection modules associated with that group of local centers.

12. A method of responding to disturbances on a high-voltage transmission line of a high-voltage power grid comprising:
provide a plurality of distributed impedance injection modules each coupled to a high-voltage transmission line, distributed over a plurality of high-voltage transmission lines of a high-voltage power grid;
sensing by a controller of the impedance injection module disturbances on the high-voltage transmission line of the high-voltage power grid;
generating by the impedance injection module inductive and/or capacitive impedances of appropriate magnitude in response to the sensed disturbances;
injecting onto the high-voltage transmission line the generated inductive and/or capacitive impedances via an injection transformer coupled to one of the high-voltage transmission lines; and
communicating at high-speed with other impedance-injection modules and a group local center, forming a local response group of impedance injection modules, the information of the sensed disturbance to enable coordinated response of the other impedance-injection modules within the respective local group of impedance-injection modules to the sensed disturbance on the high-voltage transmission line;
wherein the high-speed communication capability enabling coordinated sub-cyclic individual and group response by the distributed impedance injection modules to disturbances sensed locally.

13. The method of claim 12 further comprising:
providing a group of local centers, each local center within the group of local centers communicating at high-speed with impedance-injection modules within a respective local group of the plurality of impedance-injection modules and with other local centers within the group of local centers;
causing the respective impedance injection modules associated with the local centers of the group of local centers to act in coordination to respond at sub-cyclic speeds to disturbances sensed on the transmission lines.

14. The method of claim 13 further comprising:
providing a communication link between each local center and a system utility for communicating and providing the system utility with consolidated data and status information and receive commands and responses for implementation by the distributed impedance-injection modules in case of system-level problems on the high-voltage power grid.

* * * * *

UNITED STATES PATENT AND TRADEMARK OFFICE
CERTIFICATE OF CORRECTION

Page 1 of 1

PATENT NO. : 10,559,975 B2
APPLICATION NO. : 15/997292
DATED : February 11, 2020
INVENTOR(S) : Haroon Inam et al.

It is certified that error appears in the above-identified patent and that said Letters Patent is hereby corrected as shown below:

On the Title Page

In the First Column, in item [72], under Inventors, at Line 5, please delete "Aaron Zhao" and insert --Aaron Zhou--.

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*